M. G. BUNNELL.
WHEEL SUPPORT.
APPLICATION FILED SEPT. 14, 1908.
1,030,501.
Patented June 25, 1912.
2 SHEETS—SHEET 1.
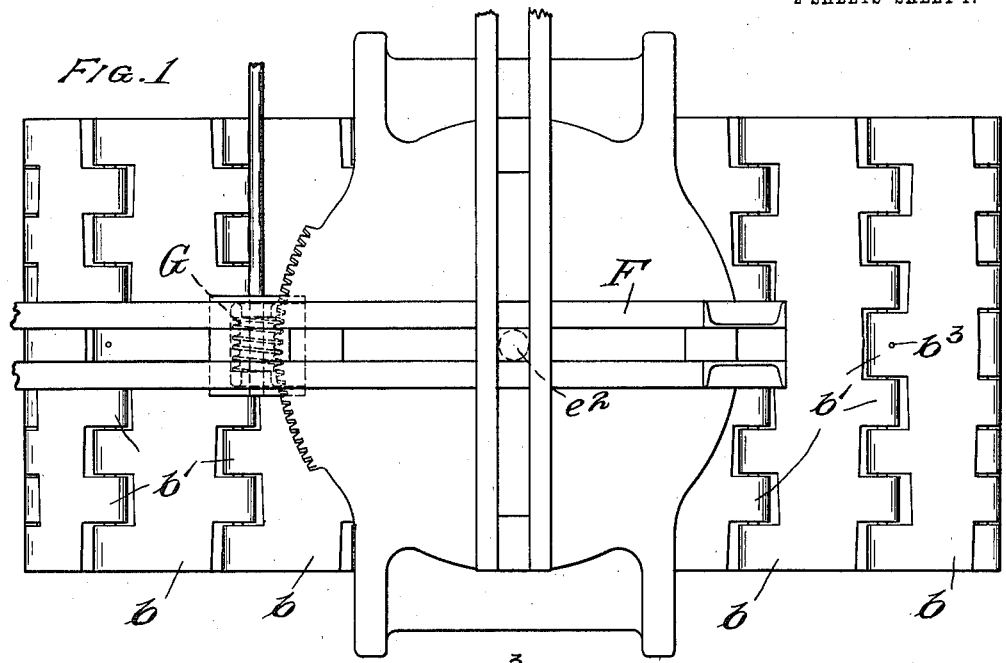
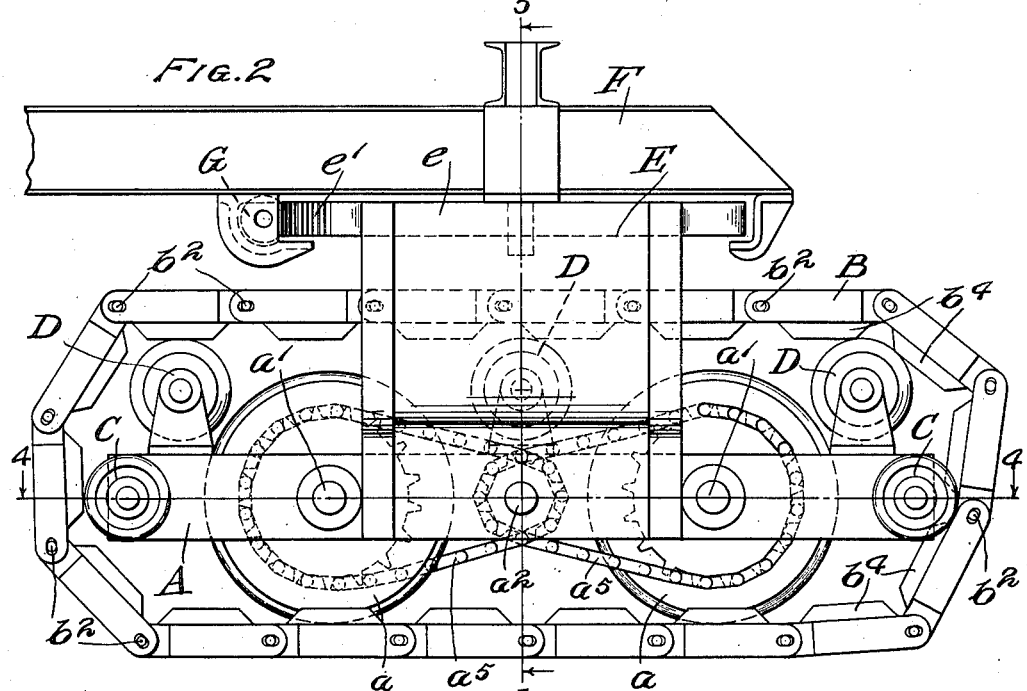
WITNESSES
A. Andersen.
C. E. Taylor.
INVENTOR:
MORTON G. BUNNELL,
By Bulkley Durand Drury
ATTORNEYS M. G. BUNNELL.
WHEEL SUPPORT.
APPLICATION FILED SEPT. 14, 1908.
1,030,501.
Patented June 25, 1912.
2 SHEETS—SHEET 2.
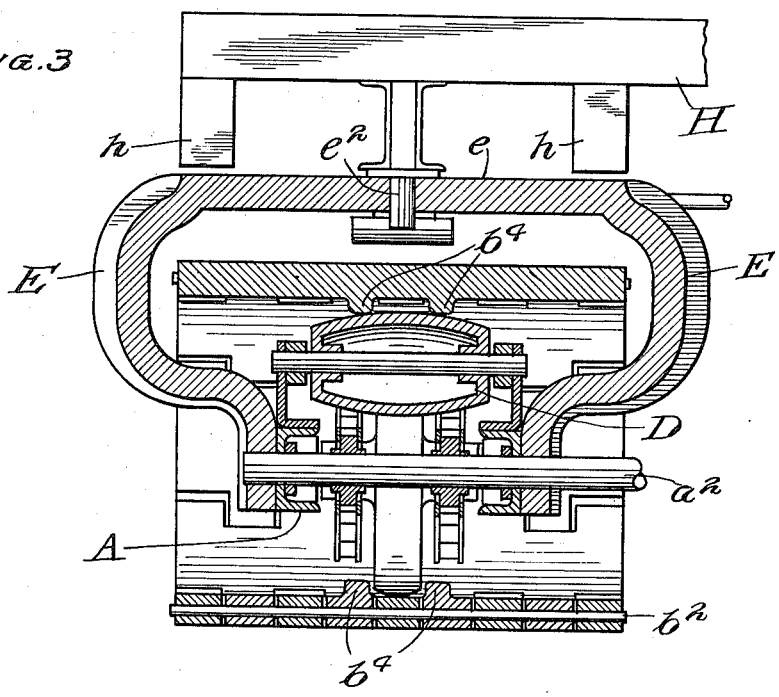
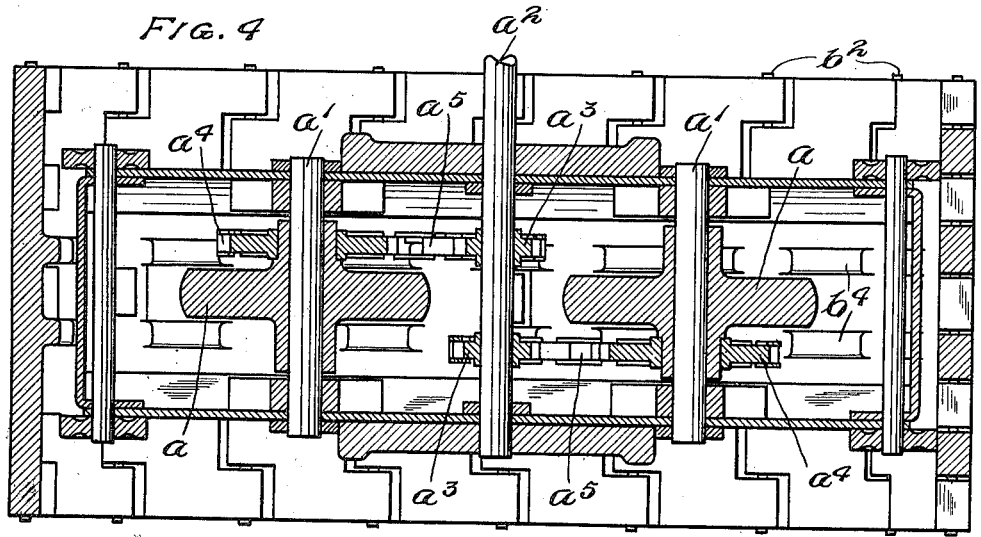
WITNESSES
A. Andersen.
C. E. Taylor.
INVENTOR:
MORTON G. BUNNELL,
By Bulkley, Durand & Drury,
ATTORNEYS

UNITED STATES PATENT OFFICE.

MORTON G. BUNNELL, OF CHICAGO, ILLINOIS, ASSIGNOR TO FREDERICK C. AUSTIN, OF CHICAGO, ILLINOIS.

WHEEL-SUPPORT.

1,030,501.   Specification of Letters Patent.   Patented June 25, 1912.

Application filed September 14, 1908. Serial No. 452,877.

*To all whom it may concern:*

Be it known that I, MORTON G. BUNNELL, a citizen of the United States of America, and resident of Chicago, Cook county, Illinois, have invented a certain new and useful Improvement in Wheel-Supports, of which the following is a specification.

My invention relates to endless tracks or ways of the kind used in supporting the wheels of heavy bodies, and which usually consist of an endless link belt arranged to travel on the ground in advance of and under the wheels, whereby a broad, endless self-laying track is provided for supporting the wheels on soft ground.

In certain respects, my invention is in the nature of an improvement on the endless traveling wheel support disclosed in my co-pending application number 452,876 of even date herewith.

An object of my present invention is to provide an arrangement whereby the vertical pivot about which the wheels are swung laterally to steer the body or vehicle is located above the endless traveling belt or support, thus giving greater clearance between the belt or support of one side and that of the other, to permit the machine to pass over obstructions, and enabling the truck formed by each set of wheels and belt to be turned or skewed in either direction about the said pivot to any extent necessary for properly steering the body or vehicle in the desired direction.

Another object is to provide improved means for steering or directing the course of travel of the wheels.

A further object is to provide efficient means for driving the wheels.

It is also an object to provide an improved arrangement whereby the entire truck comprising the wheels and endless link belt upon which the same travel is free to tilt about a horizontal axis, thus enabling the forward end of the truck to rise when the rear end falls, and vice versa, and thereby insuring against breakage or straining of the truck when the same is compelled to travel over rough or uneven ground.

To the foregoing and other useful ends, my invention consists in matters hereinafter set forth and claimed.

In the accompanying drawings:—Figure 1 is a top plan view of a wheeled truck and endless link belt or traveling track embodying the principles of my invention. Fig. 2 is a side elevation of the truck shown in Fig. 1. Fig. 3 is a vertical cross section on line 3—3 in Fig. 2. Fig. 4 is a horizontal section on line 4—4 in Fig. 2.

As thus illustrated, my invention comprises a rectangular truck frame A provided with tandem wheels $a$ mounted on axles or journals $a'$, which latter are connected with a centrally arranged driving shaft $a^2$ through the medium of sprockets $a^3$ thereon, sprockets $a^4$ on the wheels, and sprocket chains $a^5$, one chain connecting the shaft $a^2$ with one wheel, and the other chain connecting the said shaft with the other wheel. In this way power communicated to the shaft $a^2$ will be transmitted for the purpose of driving the two supporting wheels $a$ in unison, causing the same to roll forward in the desired direction. The said wheels, it will be seen, roll upon and are supported by an endless link belt B, which latter serves as a traveling or self-laying track or way, and which is composed of links $b$ having interlocking portions $b'$ pivotally connected together by rods or pins $b^2$, in the manner shown. These rods $b^2$ are held in place by pins $b^3$ driven through the central portions of the links, and the openings in which the said rods work are enlarged or so formed that the ends of the links are loosely connected and have considerable lost motion between them, although their middle portions are held firmly by the pivot rods. In this way the circumference of the belt at its middle portion is non-variable in character, but at its sides the said belt can expand or contract, so as to increase or decrease in circumference, thus permitting a certain flexibility which is extremely advantageous when the truck passes over rough or unlevel ground. Furthermore, this flexibility of the belt permits the same to be flexed or deflected sidewise for the purpose of steering the truck in the desired direction, as will hereinafter more fully appear. Upon the inner surfaces of the said links there are provided two parallel rows of lugs $b^4$, which in effect form a groove or way for the wheels $a$, whereby the said wheels maintain a position at the center of the belt and are prevented from being displaced sidewise relative thereto.

The wheels roll forward in the groove provided between the lugs $b^4$, and in so doing cause the endless link belt or self-laying track to travel forward, thus forming a broad, flat supporting structure upon which the wheels can roll without danger of sinking into soft ground or mud over which the machine may be compelled to travel. In order to maintain the said endless traveling link belt or support in proper position, the truck frame is provided at its ends with wheels or rolls C which bear against the belt at the forward end thereof, but which are preferably slightly out of contact therewith at the rear end of the truck. In addition, the truck is provided with barrel-shaped supporting rolls D, that are disposed in position on top of the truck to sustain the weight of the upper portion of the link belt. With this arrangement the said link belt can lean to either side, as it is free to slide sidewise upon the rolls D, and in this way the belt can have a certain amount of lateral play and flexibility while passing over rough or uneven ground, leaving the wheels of the truck free to stand upright.

A yoke E of substantially inverted U-shape embraces the said truck and has its lower ends suitably secured to the sides of the truck A, and has its upper end provided with a flat supporting surface $e$, the rear edge of which is provided with a semicircular rack $e'$, as illustrated. The said yoke is pivoted to the frame F by means of a pin or pivot $e^2$, which latter serves as the vertical axis about which the truck is free to swing for the purpose of directing the course of the vehicle or body supported thereon. A worm G is journaled on the frame F and adapted to engage the rack $e'$, whereby the entire truck is turned in either direction to determine the proper course of travel thereof.

It will be seen that the cross beam H of the vehicle has blocks or bearing portions $h$ adapted to ride upon the flat upper surface $g$ to insure against breakage of the pivot pin $e^2$, thus providing a sort of fifth wheel arrangement which supports the weight of the vehicle and permits the truck to be turned or skewed in either direction. If two of these trucks are connected with the cross beam H, one at each side of the vehicle or movable body to be supported, it will be seen that good clearance is provided between the same, inasmuch as the said beam is entirely above the endless link belts or traveling supports for the wheels, and inasmuch as the pivots or axes about which the trucks turn are also disposed at a distance more or less above the said link belts. Furthermore, with this arrangement the trucks can be turned or skewed freely in either direction, and to a considerable degree, inasmuch as the construction is such that the trucks could swing clear around, if such were desirable, without coming in collision with the bolster or cross beam H, although for practical purposes no such extreme degree of adjustment of the parts is necessary in order to properly steer the vehicle. The clearance between the two trucks thus connected by overhead pivots to the body of the vehicle is sufficient to enable the latter to pass over stumps or rocks or other obstructions extending more or less above the axes of the wheels, and thus the vehicle or machine for which the trucks are employed is able to travel over rough surfaces which otherwise might create more or less difficulty and interference with the advance of the machine in the direction necessary for carrying on the desired work.

As the power is communicated to the wheels $a$ at a point located centrally between the same, as for example through the shaft $a^2$, it will be seen that whatever power transmitting connection is employed for driving this shaft will be subject to no undesirable displacement, inasmuch as this shaft $a^2$ is directly below the pivot pin $e^2$, and hence when the truck is turned or skewed to one side the shaft $a^2$ has no endwise movement whatever.

By means of the worm gearing provided for steering the truck, the latter is held firmly to the desired direction of travel, and is easily steered in any direction. The steering of the truck, it will be seen, is made easy by reason of the free lateral flexibility of the belt B, and is accomplished by turning the truck a little and just enough to flex the front end of the belt sidewise, and by then causing the wheels to travel forward enough to bring the balance of the belt into line, which operation is then repeated until the entire truck has been brought to the position necessary for causing the vehicle to travel in the desired direction.

It will be understood that any suitable number of trucks of the character shown can be employed for supporting the vehicle or movable body, and that any suitable arrangement can be employed for operating the steering mechanism thereof, as well as for communicating power to the supporting wheels of the same.

It will be seen that the yoke E rests upon the ends of shaft $a^2$, whereby the latter serves as an axle or horizontal axis about which the entire truck can rock when the same is compelled to travel over rough or uneven ground. In other words, the front end of the truck can rise when the rear end falls, and vice versa, and thus both ends of the truck will always be in contact with the ground, even though the surface of the latter be undulating or hilly.

What I claim as my invention is:—

1. In a structure of the class set forth, an endless link belt adapted to travel along the ground, wheels adapted to travel upon and be supported by said link belt, means whereby only the lower horizontal portion of the belt is in contact with said wheels, a pivot above said belt, and means for causing the wheels and belt to swing laterally about said pivot to change the direction of travel thereof.

2. In a structure of the class set forth, an endless belt adapted to travel on the ground, supporting wheels adapted to roll upon and be supported by said endless belt, means whereby only the lower horizontal portion of the belt is in contact with said wheels, a driving shaft between said wheels, and a power transmitting connection from each wheel to said shaft.

3. In a structure of the class set forth, an endless link belt adapted to travel on the ground, wheels supported by said belt and adapted to travel thereon, means whereby only the lower horizontal portion of the belt is in contact with said wheels, a driving shaft intermediate said wheels, power transmitting connection from said shaft to said wheels, and a vertical axis intersecting said shaft, about which the said wheels and belt swing laterally to change the direction of travel thereof.

4. In a structure of the class set forth, an endless link belt adapted to travel along the ground, wheels supported by said link belt and adapted to roll along thereon, means whereby only the lower horizontal portion of the belt is in contact with said wheels, and means including a worm gearing for swinging the wheels and belt laterally about a vertical axis to change the direction of travel thereof.

5. In a structure of the class set forth, a rectangular truck frame, wheels on said frame, an endless link belt inclosing said wheels and supporting the same on the ground, means whereby only the lower horizontal portion of the belt is in contact with said wheels, a yoke of substantially inverted U-shape embracing said belt and having the lower ends thereof secured to said truck frame, and a pivot for the upper end of said yoke whereby the wheels and belt are free to swing laterally to change the direction of travel thereof.

6. In a structure of the class set forth, an endless traveling support, wheels supported by and adapted to roll thereon, means whereby only the lower portion of the belt is in contact with said wheels, and means whereby the said traveling support is movable about a horizontal axis disposed substantially midway between its front and rear ends.

7. In a structure of the class set forth, an endless traveling link belt, front and rear wheels adapted to travel in line with each other upon said belt, means whereby only the lower horizontal portion of the belt is in contact with said wheels, and a horizontal axis extending transversely of the line of travel and about which the wheels and belt are adapted to vibrate while traveling over rough or uneven ground.

8. In a structure of the class set forth, an endless link belt adapted to travel along the ground, wheels adapted to travel upon and be supported by said link belt, a pivot above said belt, and means for causing the wheels and belt to swing laterally about said pivot to change the direction of travel thereof, said endless link belt being adapted to flex or bend laterally to change the direction of travel thereof.

9. In a structure of the class set forth, an endless link belt adapted to travel on the ground, wheels supported by said belt and adapted to travel thereon, a driving shaft intermediate said wheels, power transmitting connection from said shaft to said wheels, and a vertical axis intersecting said shaft, about which the said wheels and belt can swing laterally to change the direction of travel thereof, said endless link belt being adapted to flex or bend laterally when the structure is turned about said vertical axis, to change the direction of travel thereof.

10. In a structure of the class set forth, an endless link belt adapted to travel along the ground, wheels disposed inside of said link belt and adapted to roll along thereon, as the belt travels along the ground and means including a worm gearing for swinging the wheels and belt laterally about a vertical axis, to change the direction of travel thereof, said axis being disposed centrally of the belt, and connecting the same to the body, said endless link belt being adapted to flex or bend laterally, when the structure is turned about said vertical axis, to change the direction of travel thereof.

11. In a structure of the class set forth, a rectangular truck frame, wheels on said frame, an endless link belt inclosing said wheels and supporting the same on the ground, a yoke of substantially inverted U-shape embracing said belt and having the lower ends thereof secured to said truck frame, and a pivot for the upper end of said yoke whereby the wheels and belt are free to swing laterally about a vertical axis to change the direction of travel thereof, said endless link belt being adapted to flex or bend laterally, when the structure is turned about said vertical axis to change the direction of travel thereof.

12. In a structure of the class set forth, an endless traveling link belt, front and rear wheels adapted to travel upon and be supported by said belt, a horizontal axis extending transversely of the line of travel and about which the wheels and belt are adapted to vibrate while traveling over rough or uneven ground, and means for skewing said wheels on the belt, said endless traveling link belt being adapted to flex or bend laterally, when the wheels are skewed to change the direction of travel thereof.

13. In a structure of the class set forth, an endless link belt adapted to travel along the ground, wheels adapted to travel upon and be supported by said link belt, a pivot above said belt, and means for causing the wheels and belt to swing laterally about said pivot to change the direction of travel thereof, the upper portion of said endless link belt being free to slide laterally to either side, below said pivot, without disturbing said wheels from their upright position.

14. In a structure of the class set forth, an endless support adapted to travel on the ground, supporting wheels adapted to roll upon and be supported by said endless support, a driving shaft between said wheels, and power transmitting connection from each wheel to said shaft, the upper portion of said endless support being free to slide laterally to either side, below said pivot, without disturbing said wheels from their upright position.

15. In a structure of the class set forth, an endless link belt adapted to travel on the ground, wheels supported by said belt and adapted to travel thereon, a driving shaft intermediate said wheels, power transmitting connection from said shaft to said wheels, and a vertical axis intersecting said shaft, about which the said wheels and belt swing laterally to change the direction of travel thereof, the upper portion of said endless link belt being free to slide laterally to either side, below said pivot, without disturbing said wheels from their upright position.

16. In a structure of the class set forth, an endless link belt adapted to travel along the ground, wheels supported by said link belt and adapted to roll along thereon, and means including a worm gearing for swinging the wheels and belt laterally about a vertical axis to change the direction of travel thereof, the upper portion of said endless link belt being free to slide laterally to either side, below said pivot, without disturbing said wheels from their upright position.

17. In a structure of the class set forth, a rectangular truck frame, wheels on said frame, an endless link belt inclosing said wheels and supporting the same on the ground, a yoke of substantially inverted U-shape embracing said belt and having the lower ends thereof secured to said truck frame, and a pivot for the upper end of said yoke whereby the wheels and belt are free to swing laterally to change the direction of travel thereof, the upper portion of said endless link belt being free to slide laterally to either side, below said pivot, without disturbing said wheels from their upright position.

18. In a structure of the class set forth, an endless traveling support, wheels supported by and adapted to roll thereon, and means whereby the said traveling support is movable about a horizontal axis disposed substantially midway between its front and rear ends, the upper portion of said endless traveling support being free to slide laterally to either side, below said pivot, without disturbing said wheels from their upright position.

19. In a structure of the class set forth, an endless traveling link belt, front and rear wheels adapted to travel upon and be supported by said belt, and a horizontal axis extending transversely of the line of travel and about which the wheels and belt are adapted to vibrate while traveling over rough or uneven ground, the upper portion of said endless traveling link belt being free to slide laterally to either side, below said pivot, without disturbing said wheels from their upright position.

Signed by me at Chicago, Cook county, Illinois, this 29th day of August 1908.

MORTON G. BUNNELL.

Witnesses:
J. NORBY,
ELLEN CLEGG.